(12) United States Patent
Westmoreland

(10) Patent No.: US 9,935,549 B2
(45) Date of Patent: Apr. 3, 2018

(54) MULTI-SWITCH POWER CONVERTER

(71) Applicant: Toshiba International Corporation, Houston, TX (US)

(72) Inventor: David Martin Westmoreland, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 0 days.

(21) Appl. No.: 15/205,141

(22) Filed: Jul. 8, 2016

(65) Prior Publication Data

US 2018/0013346 A1   Jan. 11, 2018

(51) Int. Cl.
| | |
|---|---|
| *H02M 3/156* | (2006.01) |
| *H02M 3/158* | (2006.01) |
| *H02M 7/483* | (2007.01) |
| *H02M 7/487* | (2007.01) |
| *H02M 1/42* | (2007.01) |
| *H02M 1/14* | (2006.01) |

(52) U.S. Cl.
CPC ............ *H02M 3/158* (2013.01); *H02M 1/14* (2013.01); *H02M 1/42* (2013.01)

(58) Field of Classification Search
CPC .... H02M 3/156; H02M 3/1588; H02M 7/483; H02M 7/487
See application file for complete search history.

(56) References Cited

U.S. PATENT DOCUMENTS

| | | | | |
|---|---|---|---|---|
| 7,746,041 B2* | 6/2010 | Xu | ........................... | H02M 1/14 323/223 |
| 8,106,635 B2* | 1/2012 | Watanabe | ............. | H02M 3/158 323/223 |
| 8,604,757 B2* | 12/2013 | Okuda | .................. | H02M 3/158 323/225 |
| 8,664,926 B2* | 3/2014 | Nakatomi | ............. | H02M 3/156 323/268 |
| 9,007,040 B2* | 4/2015 | Ikeda | .................... | H02M 3/158 323/222 |

(Continued)

OTHER PUBLICATIONS

Wu, Hongyang, and Xiangning He. "Single phase three-level power factor correction circuit with passive lossless snubber." IEEE Transactions on Power Electronics 17.6 (2002): 946-953.

(Continued)

*Primary Examiner* — Timothy J Dole
*Assistant Examiner* — Sisay G Tiku
(74) *Attorney, Agent, or Firm* — Baker Botts L.L.P.

(57) ABSTRACT

In accordance with presently disclosed embodiments, a 5-switch power conversion circuit that improves the power conversion efficiency (PCE) of a DC-DC converter with a double chopper topology is provided. The power conversion circuit adds minimal complexity through an additional switch, while preserving the benefits of a 3-level boost converter topology. The disclosed power conversion circuit uses four switches that are arranged in a 3-level boost converter arrangement, and a fifth switch that is connected in parallel with two of the other switches. The fifth switch helps to reduce the conduction power losses through the DC-DC converter by providing a one-switch ON-state conduction path instead of a two-switch path during part of the DC-DC power conversion cycle.

16 Claims, 10 Drawing Sheets

(56) References Cited

U.S. PATENT DOCUMENTS

| | | | | |
|---|---|---|---|---|
| 9,007,042 B2* | 4/2015 | Okuda | ................. | H02M 3/158 |
| | | | | 323/271 |
| 2005/0174098 A1* | 8/2005 | Watanabe | ............. | H02M 3/158 |
| | | | | 323/282 |
| 2008/0094042 A1* | 4/2008 | Ferrario | ................ | G03B 15/05 |
| | | | | 323/234 |
| 2008/0197706 A1* | 8/2008 | Nielsen | ................... | H02J 1/102 |
| | | | | 307/66 |
| 2008/0211316 A1* | 9/2008 | Watanabe | ............. | H02M 3/158 |
| | | | | 307/110 |
| 2009/0033289 A1* | 2/2009 | Xing | .................... | H02J 7/0065 |
| | | | | 320/140 |
| 2012/0126764 A1* | 5/2012 | Urakabe | .............. | H02M 3/158 |
| | | | | 323/282 |
| 2015/0084611 A1* | 3/2015 | Agrawal | .............. | H02M 3/158 |
| | | | | 323/282 |
| 2015/0097492 A1* | 4/2015 | Ma | .................... | H05B 33/0815 |
| | | | | 315/186 |

OTHER PUBLICATIONS

Lin, Bor-Ren, Yi-Lang Hou, and Huann-Keng Chiang. "Implementation of a three-level rectifier for power factor correction." IEEE Transactions on Power Electronics 15.5 (2000): 891-900.

Zhang, Michael T., et al. "Single-phase three-level boost power factor correction converter." Applied Power Electronics Conference and Exposition, 1995. APEC'95. Conference Proceedings 1995., Tenth Annual. IEEE, 1995.

Kang, Yonghan. Design and implementation of high efficiency, high power density front-end converter for high voltage capacitor charger. Diss. Virginia Polytechnic Institute and State University, 2005.

* cited by examiner

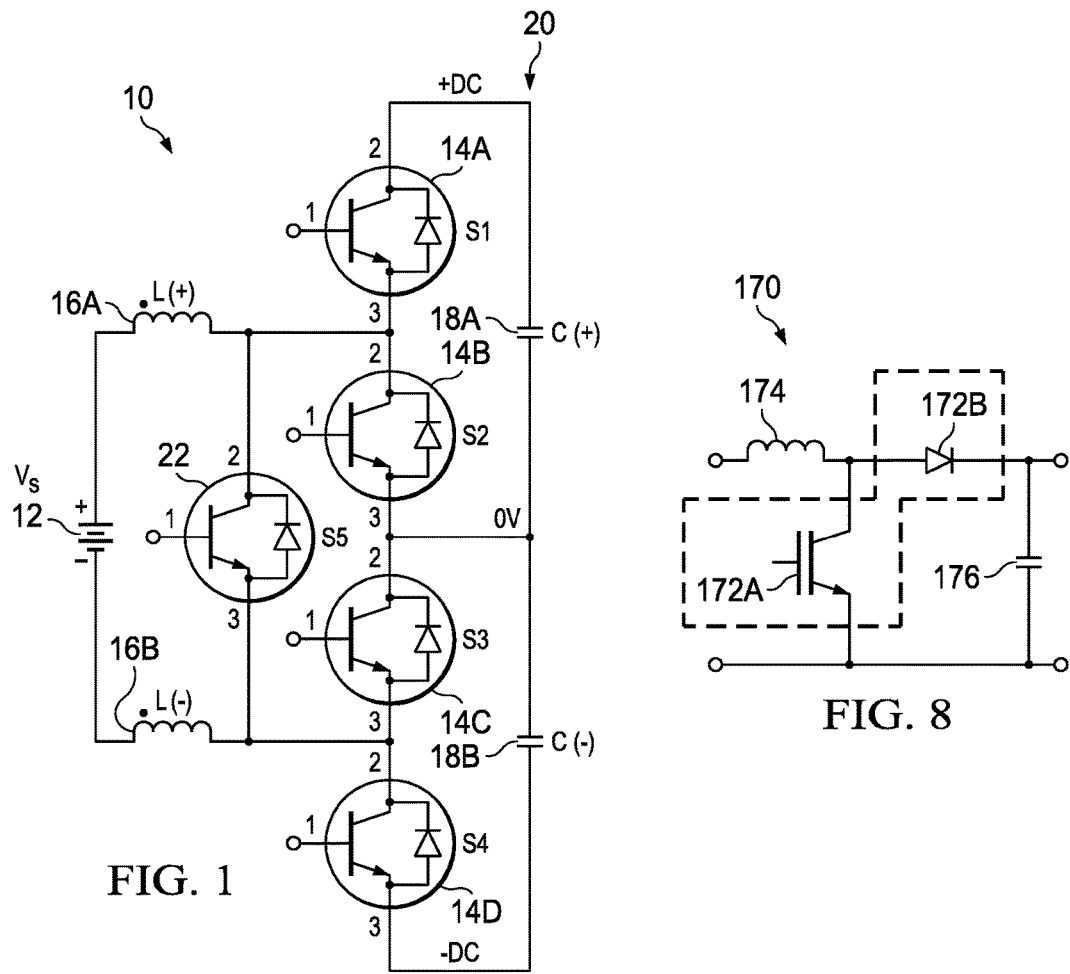
FIG. 1
FIG. 8
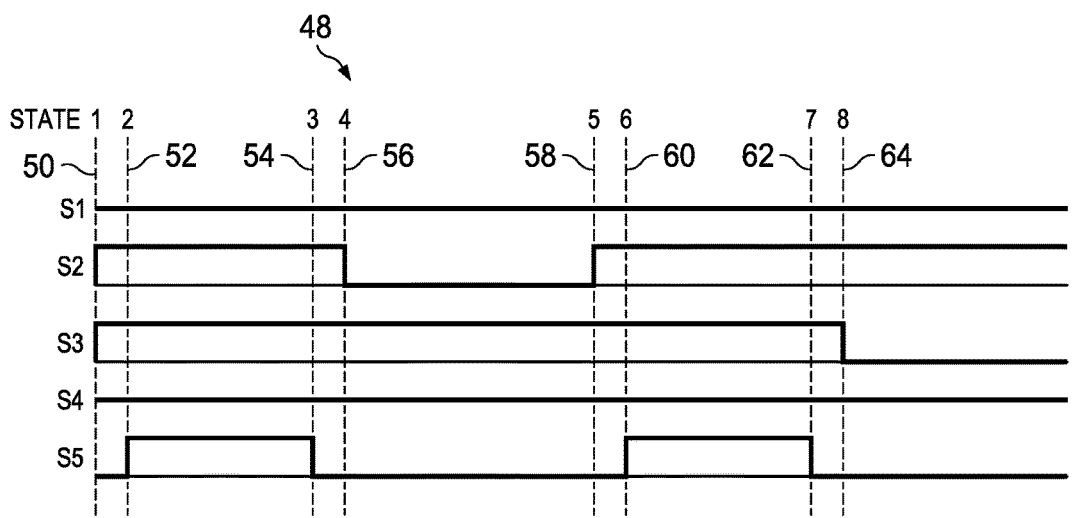
FIG. 2

MULTI-SWITCH POWER CONVERTER

TECHNICAL FIELD

Embodiments of the present disclosure relate to DC-DC power converters and, more particularly, to a multi-switch topology used to increase the power conversion efficiency (PCE) of a DC-DC power converter, power factor corrector (PFC), or power inverter.

BACKGROUND

DC-DC converters can be used in a wide variety of power electronic applications to step up or step down the voltage from an input DC supply to an output DC load. Standard single phase DC-DC converters often include semiconductors (e.g., a diode and a transistor), an inductor, and one or more capacitors used to reduce voltage ripple. It is known that DC-DC converters having a 3-level structure or topology can offer certain operational advantages over traditional two-level DC-DC converters. Specifically, by structuring the DC-DC converter with a 3-level topology, it is possible to reduce the voltage stresses on the switching devices and increase the current ripple frequency through the inductor, thus increasing the power conversion efficiency (PCE) and enabling smaller electronic components to be employed in the system. It is also possible to increase the PCE in such systems by utilizing more efficient switching devices and inductors in the converter, or by modifying the converter's modulation pattern. Even so, it is desirable to further improve the PCE in DC-DC converters for use in certain power electronic applications, such as in uninterruptible power supplies (UPS) and adjustable speed drives (ASD).

SUMMARY

In accordance with the above, presently disclosed embodiments are directed to a 5-switch power conversion circuit that improves the power conversion efficiency (PCE) of a DC-DC converter with a double chopper topology. The power conversion circuit adds minimal complexity through an additional switch, while preserving the benefits of a 3-level boost converter topology. The disclosed power conversion circuit may be used in a system that supports bi-directional power flow, such as an uninterruptible power supply (UPS), such that the circuit can act as either a DC-DC boost "chopper" or as a DC-DC buck battery charger.

The disclosed power conversion circuit uses four switches that are arranged in a 3-level boost converter arrangement, and a fifth switch that is connected in parallel with two of the other switches. The fifth switch helps to reduce the conduction power losses through the DC-DC converter by providing a one-switch ON-state conduction path which acts in parallel with the existing two-switch path during part of the DC-DC power conversion cycle. The disclosed power conversion circuit allows the system to achieve a higher PCE than would be possible using a typical 3-level boost converter topology. Due to the increased PCE, the disclosed power conversion circuit may improve the load handling capabilities of the power converter while using standard (or improved) power switching devices for better overall gains.

BRIEF DESCRIPTION OF THE DRAWINGS

For a more complete understanding of the present disclosure and its features and advantages, reference is now made to the following description, taken in conjunction with the accompanying drawings, in which:

FIG. 1 is a schematic circuit diagram of a 5-switch power conversion circuit, in accordance with an embodiment of the present disclosure;

FIG. 2 is a plot illustrating a switching control scheme for the 5-switch power conversion circuit of FIG. 1 when it is operated in a DC-DC boost mode, in accordance with an embodiment of the present disclosure;

FIG. 8 is a schematic diagram of a basic DC-DC power conversion circuit utilized in a simulation to estimate the reduction in power losses using a 5-switch power conversion circuit, in accordance with an embodiment of the present disclosure.

DETAILED DESCRIPTION

Figure 3A:
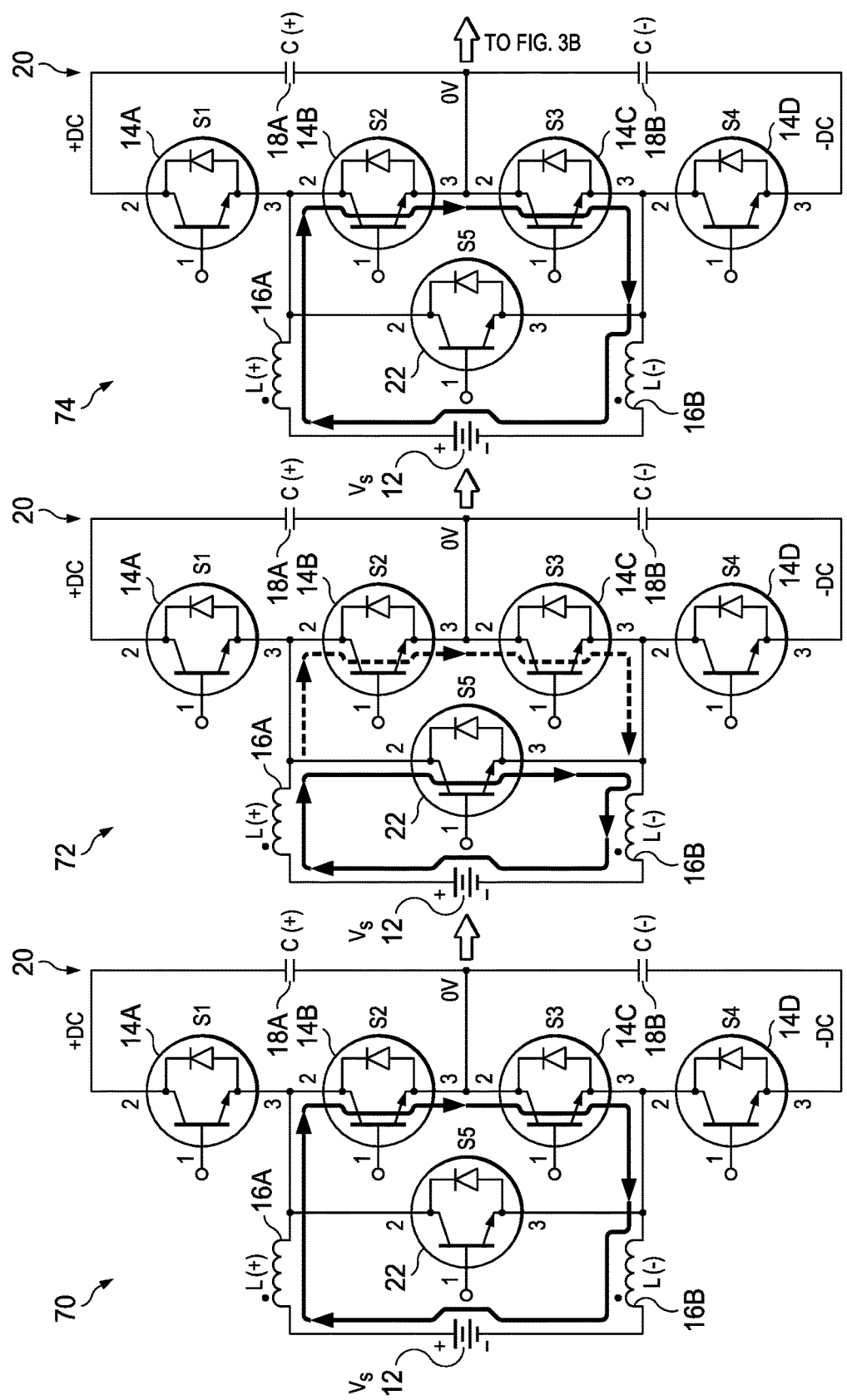
FIGS. 3A-3C are a series of schematic diagrams illustrating current flow through the 5-switch power conversion circuit of FIG. 1 when it is operated in a DC-DC boost mode, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Turning now to the drawings, FIG. 1 illustrates a 5-switch power conversion circuit 10 for use in any number of DC-DC power conversion applications. The power conversion circuit 10 includes a voltage supply 12 (Vs), four switch transistors 14A-14D (S1-S4, respectively), two inductors 16A (L(+)) and 16B (L(−)), and two capacitors 18A (C(+)) and 18B (C(−)). The voltage supply 12 may be a rectified DC input, DC input supplied by a battery, or any other desirable DC input. The inductors 16 are coupled to opposite sides of the voltage supply 12. In other embodiments, the power conversion circuit may include just one inductor 16 coupled to one side of the voltage supply 12.

The voltage supply 12 and the inductors 16 are coupled to a DC bus 20 via the four switch transistors 14. The voltage supply 12, switch transistors 14, inductors 16, and capacitors 18 are arranged to form a 3-level boost-type DC-DC power conversion circuit. More specifically, the first switch transistor 14A is coupled between a first (positive) side of the voltage supply 12 and a first (positive) side of the first capacitor 18A, the second switch transistor 14B is coupled between the first side of the voltage supply 12 and a second (negative) side of the first capacitor 18A. The third switch transistor 14C is coupled between a second (negative) side of the voltage supply 12 and a first (positive) side of the second capacitor 18B, and the fourth switch transistor 14D is coupled between the second side of the voltage supply 12 and a second (negative) side of the second capacitor 18B.

The switch transistors 14A, 14B, 14C, and 14D are controlled by signals applied to their respective gates to convert power from the voltage supply 12 to a higher voltage output across the DC bus. In some embodiments, the switch transistors 14 may also be controlled by the signals applied to their gates to convert draw power from one or both sides of the DC bus 20 for charging a battery (i.e., voltage supply 12) or otherwise operate in a DC-DC buck mode.

In addition to the four switches 14, the disclosed power conversion circuit 10 further includes a fifth switch transistor 22 (S5). The fifth switch transistor 22 is coupled in parallel to the switches 14B and 14C, as shown. The fifth switch 22 may be controlled to reduce the ON-state conduction path through the power conversion circuit 10 during certain portions of the DC-DC converter operations. More specifically, the fifth switch 22 may be switched to the ON state at a point in the DC boost cycle when both the second and third switches 14B and 14C are in the ON state. That way, the current will flow through the inductors 16 and the fifth switch 22 instead of through the inductors 16 and the second and third switches 14B and 14C. This reduces the conduction losses through the power conversion circuit 10, due to the current flowing primarily through only one switch transistor (22) instead of two (14B and 14C).

The reduced conduction losses through the power conversion circuit 10 allow the system to achieve higher power conversion efficiency (PCE) than would be possible using a typical 3-level boost converter topology having only four switches. Due to the increased PCE, the power conversion circuit 10 may exhibit improved load handling capabilities while using standard (or improved) power switching devices for better overall gains.

Figure 3B:
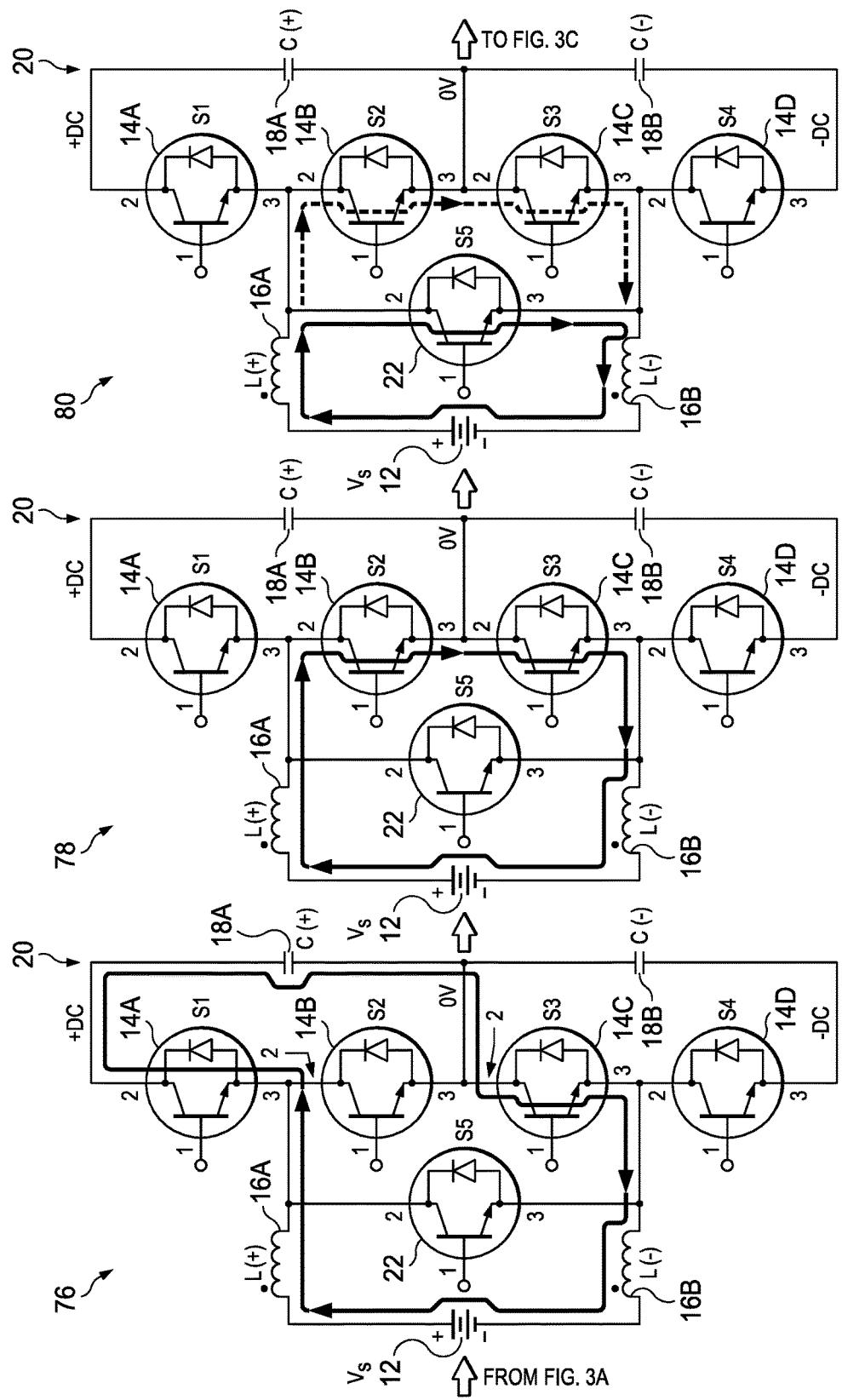
Figure 3C:
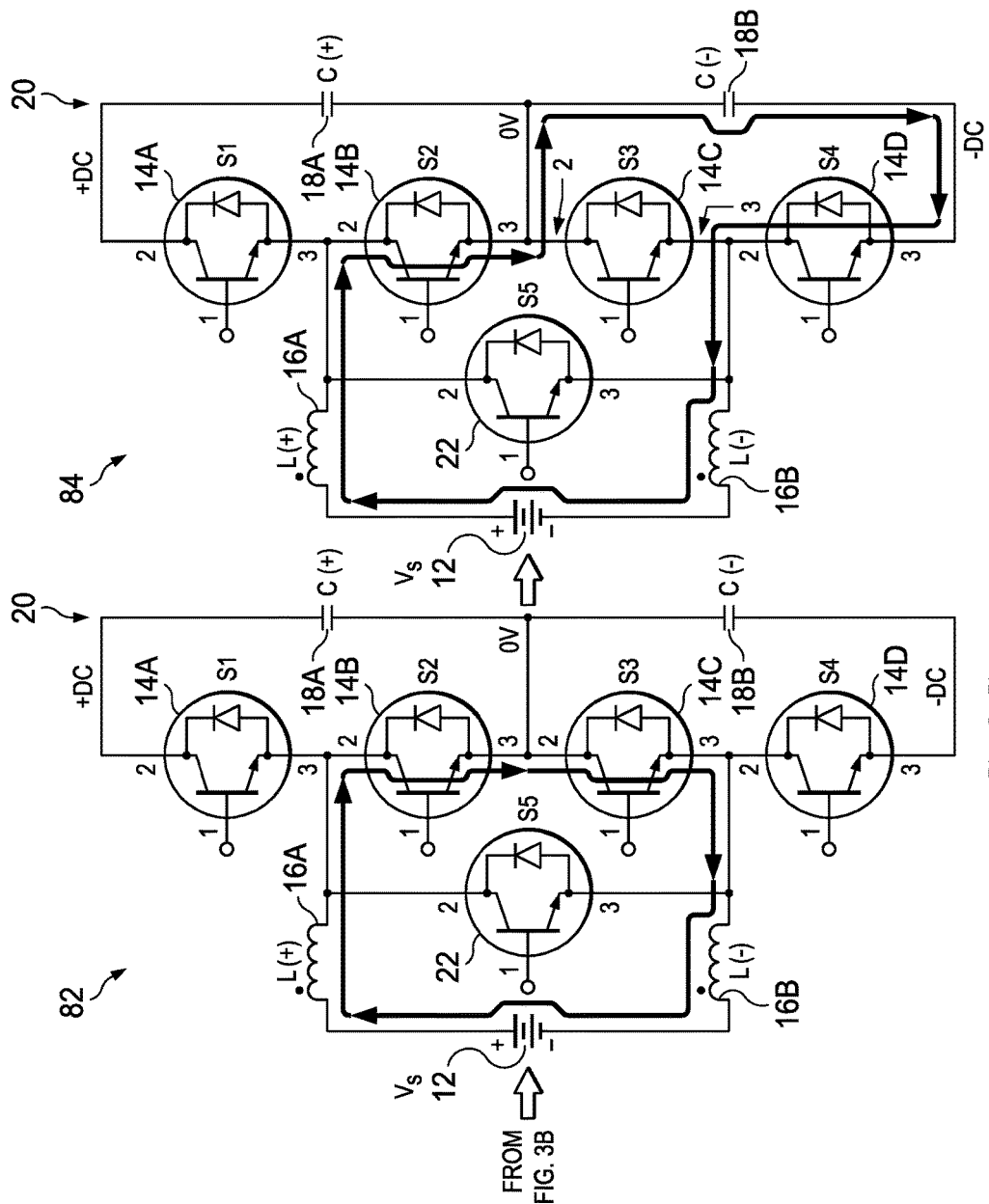

Having described the general layout of the power conversion circuit 10, a more detailed description of the switching control and operation of the power conversion circuit 10 will be described with reference to FIGS. 2 and 3. FIG. 2 is a switching diagram 48 for controlling the five switches (14A-14D and 22) of the power conversion circuit when the power conversion circuit is operating in a DC-DC boost mode. As shown, the switching diagram 48 provides 8 states 50, 52, 54, 56, 58, 60, 62, and 64, which correspond to the operation of the power conversion circuit at different stages throughout a cycle of operating in the DC-DC boost mode. FIGS. 3A-3C illustrate a current flow diagram showing the current flowpath through the 5-switch power conversion circuit 10 when the circuit is operating in the DC-DC boost mode. The current flow diagram includes 8 frames 70, 72, 74, 76, 78, 80, 82, and 84, which correspond to the 8 states 50, 52, 54, 56, 58, 60, 62, and 64, respectively, in the switching diagram 48 of FIG. 2.

In the first operational state 50, the switching diagram 48 shows S2 (14B) and S3 (14C) gated to the ON state and all others (14A, 14D, and 22) in the OFF state. As shown in frame 70 of the current flow diagram, current flows from the voltage supply 12 through the inductor 16A, the gated switch transistors 14B and 14C, the inductor 16B, and back to the voltage supply 12.

After a relatively short amount of time, the switch S5 (22) may also be gated to bring the power conversion circuit into the second operational state 52. As shown in frame 72 of the current flow diagram, current flows from the voltage supply 12 through the inductor 16A, the fifth gated transistor 22, the switch transistors S2 (14B) and S3 (14C), the inductor 16B, and back to the voltage supply 12. Although a small portion of the current flows through the two switch transistors (14B and 14C), most of the current flows through the fifth gated transistor 22. This reduces the ON-state primary conduction path from two switch transistors (14B and 14C) to one (22), thereby reducing power losses during the second state 52 of operation. The power conversion circuit operates in this second state 52 for a much longer time than it was in the first state 50.

In the third operational state 54, the switching diagram 48 shows S5 (22) switched to the OFF state, while S2 (14B) and S3 (14C) remain in the ON state. As shown in frame 74 of the current flow diagram, the power conversion circuit operates in the same manner in this third state 54 as it did in the first state 50. Throughout the first, second, and third states, the current flowing through the inductors 16 causes the inductors 16 to store energy that will later be output to the DC bus 20.

After a relatively short amount of time, the switch S2 (14B) is turned to the OFF state to bring the power conversion circuit into the fourth operational state 56. As shown in frame 76 of the current flow diagram, current flows from the voltage supply 12 through the inductor 16A, the freewheeling diode (FWD) of the switch transistor 14A, the capacitor 18A, the switch 14C, the inductor 16B, and back to the voltage supply 12. In this fourth operational state 56, the energy stored in the inductors 16 is transferred to a positive side of the DC bus 20.

The power conversion circuit is then brought to the fifth operational state 58 as the second switch S2 (14B) is gated back to the ON-state. As shown in frame 78 of the current flow diagram, the power conversion circuit operates in the same manner in this fifth state 58 as it did in the first state 50 and the third state 54. After a relatively short amount of time, the switch S5 (22) may also be gated to bring the power conversion circuit into the sixth operational state 60. The power conversion circuit operates in this sixth state 60 for a much longer time than it was in the fifth state 58. In the seventh operational state 62, the switching diagram 48 shows S5 (22) switched to the OFF state, while S2 (14B) and S3 (14C) remain in the ON state. Thus, the fifth, sixth, and seventh states 58, 60, and 62 are a repeat of the first, second, and third states 50, 52, and 54. Again, the current flowing through the inductors 16 causes the inductors 16 to store energy that will later be output to the DC bus 20.

After a relatively short amount of time, the switch S3 (14C) is turned to the OFF state to bring the power conversion circuit into the eighth operational state 64. As shown in frame 84 of the current flow diagram, current flows from the voltage supply 12 through the inductor 16A, the switch 14B, the capacitor 18B, the free-wheeling diode (FWD) of the switch transistor 14D, the inductor 16B, and back to the voltage supply 12. In this fourth operational state 56, the energy stored in the inductors 16 is transferred to a negative side of the DC bus 20.

As shown in the switching diagram 48, the switch S5 (22) is gated to the ON-state only when both S2 (14B) and S3 (14C) are both in the ON-state. This allows the power conversion circuit 10 to take advantage of reduced power losses through the low ON-state conduction path available using the fifth switch 22. However, instead of gating the fifth switch 22 immediately upon both the S2 (14B) and S3 (14C) switches being gated ON, it may be desirable to adjust the timing so that the S5 (22) switch is delayed slightly. This delay is shown in the switching diagram 48 between the first and second states 50 and 52, and between the fifth and sixth states 58 and 60.

The slight delay before switching the fifth switch 22 to the ON-state may enable more efficient operation of the power conversion circuit 10. First, the delay provides reduced switching power losses when the fifth switch 22 is activated since the second and third switches 14B and 14C are already in the ON-state. With the second and third switches 14B and 14C already ON, the current flowing through the system will be split between all three switches (14B, 14C, and 22) when the fifth switch 22 is gated to the ON-state. The fifth switch 22 provides a parallel path for the current, reducing conduction losses. The resistance of the combined path is reduced from Ron(14B+14C) to Ron(Sw22) ∥Ron(14B+14C). For example, if the resistance of each switch is the same, denoted as "Ron( . . . )", and set to 1 Ohm, the switch network path resistance drops from 2 Ohms (=1+1) to 2/3 Ohm (=1/(1/(1+1)+(1/1))), a three-fold reduction in resistance.

In addition, it may be desirable to delay turning ON the fifth switch 22 until after both switches 14B and 14C are in the ON-state so that the fifth switch 22 is turning ON under near-zero voltage conditions (=Vce(S2)+Vce(S3)). During switching of the second and/or third switches 14B and 14C into the ON-state, the voltage across these two switches is elevated. However, shortly after the switching is completely, the voltage across the switches 14B and 14C lowers to about 1 or 2 Volts. At this point, the fifth switch 22 may be turned to the ON-state. By waiting until the voltage across the parallel switches 14B and 14C approaches near-zero to activate the fifth switch 22, the fifth switch 22 does not contribute noticeable switching losses because of the near-zero voltage condition.

Similar benefits may be achieved by gating the fifth switch 22 OFF slightly before either of the switches 14B and 14C. By delaying turning OFF either of the switches 14B or 14C until after the fifth switch 22 is OFF, this ensures that the fifth switch 22 is gated OFF under the near-zero voltage condition. This delay is shown in the switching diagram 48 between the third and fourth stages 54 and 56, and between the seventh and eighth stages 62 and 64.

Figure 4:
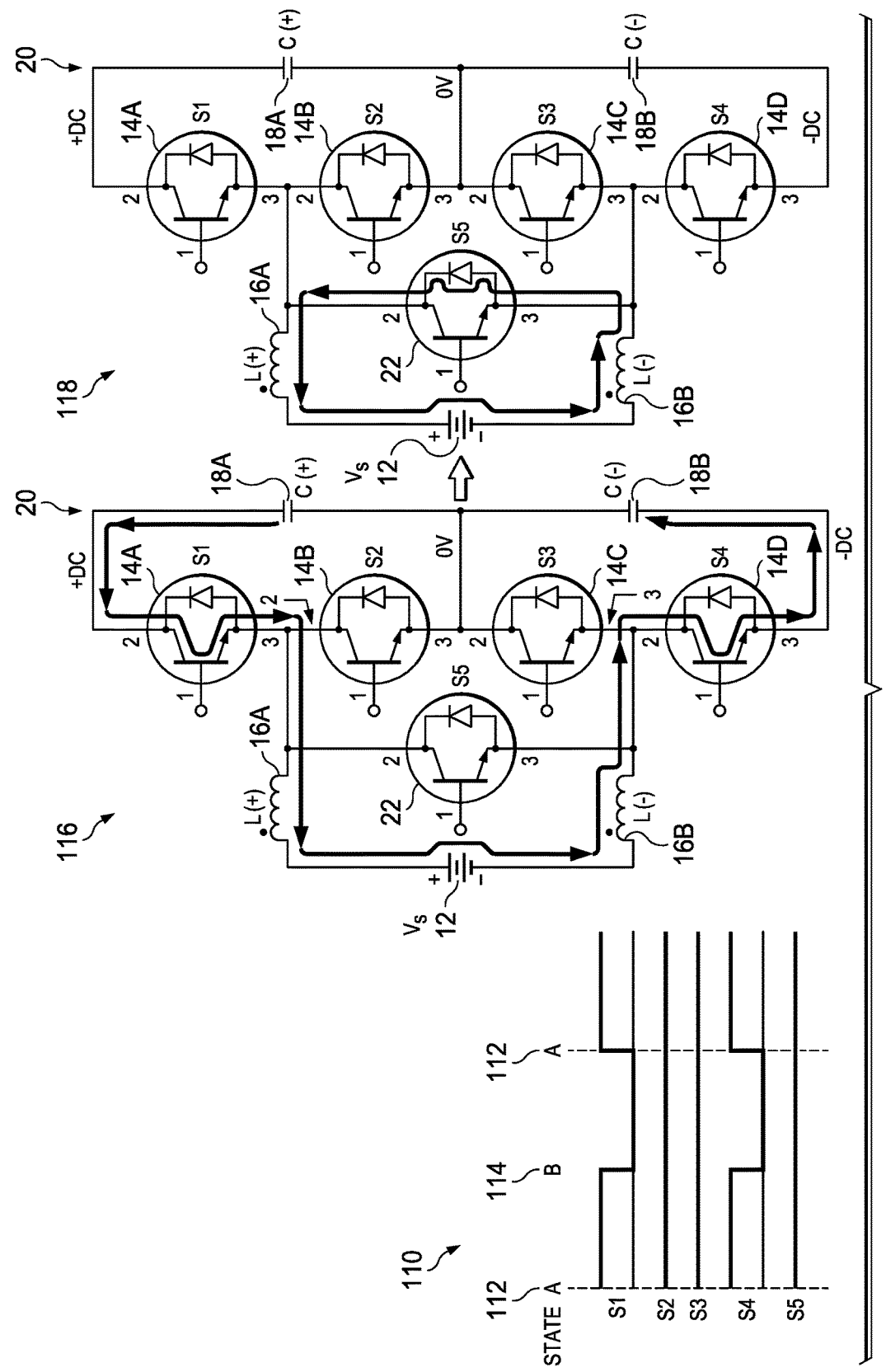
FIG. 4 is a series of schematic diagrams illustrating current flow and a switching control scheme for the 5-switch power conversion circuit of FIG. 1 when it is operated in a DC-DC step-down mode, in accordance with an embodiment of the present disclosure.

In addition to the DC-DC boost operating mode described above, the disclosed power conversion circuit 10 may also operate in a DC-DC step-down mode or buck mode. In such an operating mode, the power conversion circuit 10 may pull energy from the DC bus 20 in order to provide power for charging the voltage supply 12 (e.g., rechargeable battery). FIG. 4 depicts an embodiment of the circuit 10 operating in such a DC-DC step-down (buck) mode. FIG. 4 shows a switching diagram 110 for controlling the five switches (14A-14D and 22) of the power conversion circuit 10 when the power conversion circuit is operating in a DC-DC step-down mode. As shown, the switching diagram 110 alternates between two states 112 (A) and 114 (B), which correspond to the operation of the power conversion circuit 10 at different stages throughout a cycle of operating in the DC-DC step-down mode.

FIG. 4 also includes a current flow diagram showing the current flowpath through the 5-switch power conversion circuit 10 when the circuit is operating in the DC-DC step-down mode. The current flow diagram includes 2 frames 116 and 118, which correspond to the 2 states 112 and 114, respectively, in the switching diagram 110.

In the first operational state 112, the switching diagram 110 shows S1 (14A) and S4 (14D) gated to the ON state and all others (14B, 14C, and 22) in the OFF state. As shown in frame 116 of the current flow diagram, current flows from the positive side (capacitor 18A) of the DC bus 20, through the gated switch transistors 14A and 14D, inductors 16, power source 12, and to the negative side (capacitor 18B) of the DC bus 20. Throughout the first state 112, the current flowing through the inductors 16 causes the inductors 16 to store energy that will later be used to charge the voltage supply 12. The switches S1 (14A) and S4 (14D) are then turned to the OFF state to bring the power conversion circuit 10 into the second operational state 114. As shown in frame 118 of the current flow diagram, current flows through the voltage supply 12, the inductors 16, and the free-wheeling diode (FWD) of the fifth switch transistor 22. In this second operational state 114, the energy stored in the inductors 16 is transferred to the voltage supply 12 to charge the battery. The power conversion circuit 10 may be cycled through these two operational states 112 and 114 until the voltage supply 12 is fully charged or charged to a desired degree.

Figure 5A:
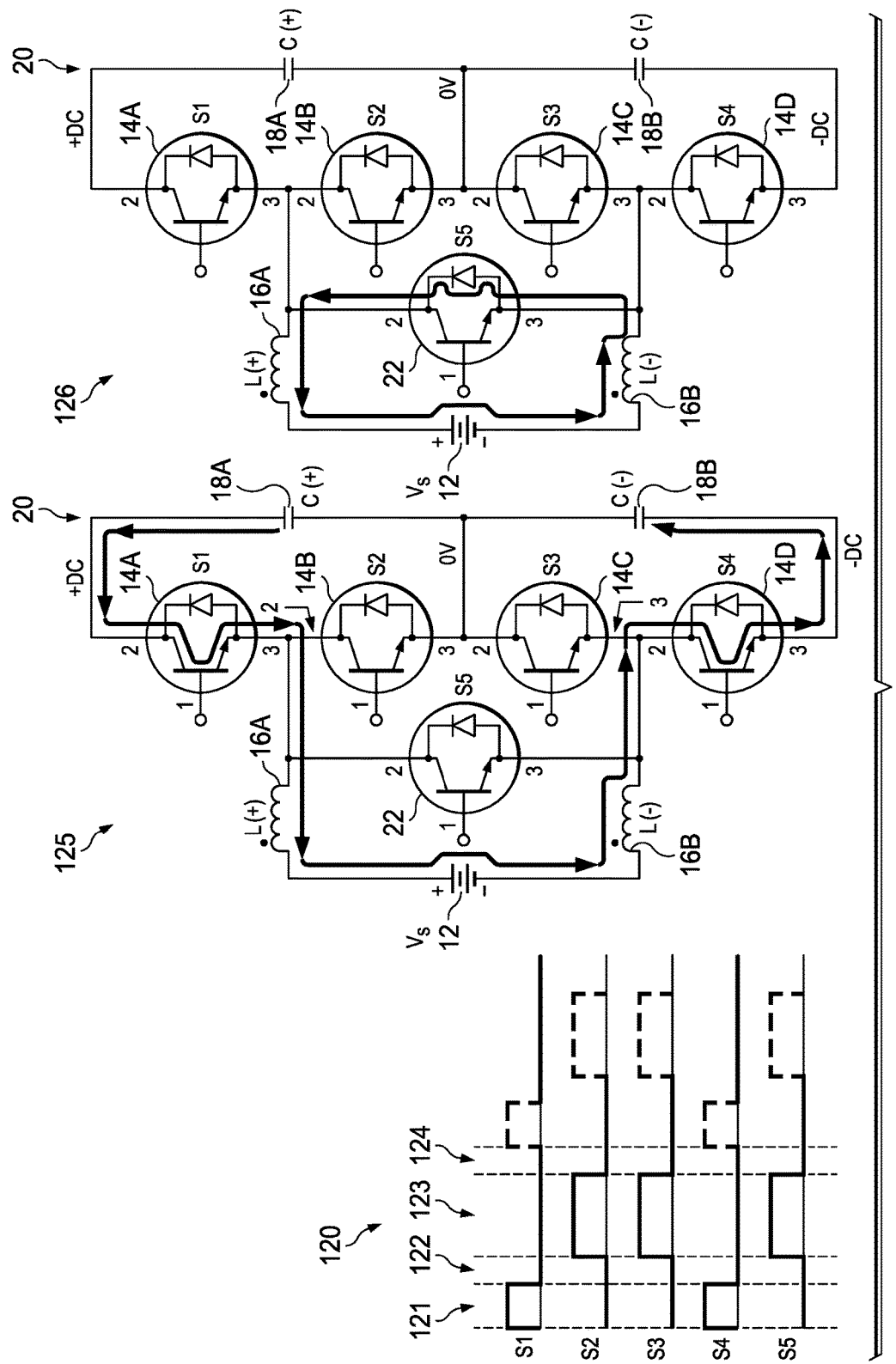
FIGS. 5A and 5B are a series of schematic diagrams illustrating current flow and a switching control scheme for the 5-switch power conversion circuit of FIG. 1 when operated in a DC-DC step-down mode with synchronous switching, in accordance with an embodiment of the present disclosure.
Figure 5B:
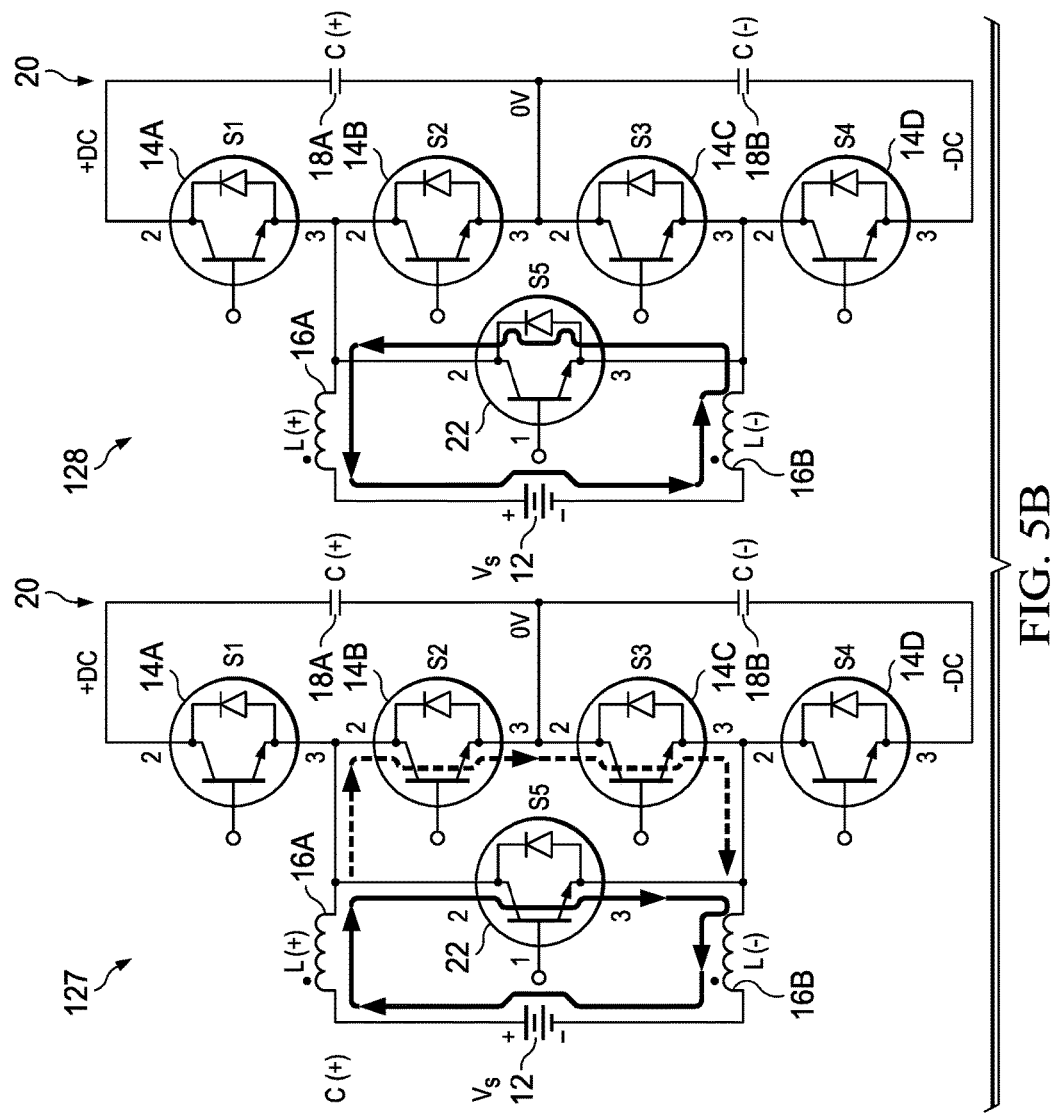

If MOSFETs, SiC, or other switching devices are employed whose channels have the ability to conduct bi-directionally, synchronous switching may be applied to further reduce the switching losses during the DC-DC step-down mode, as illustrated in FIGS. 5A and 5B. FIG. 5A shows a switching diagram 120 for controlling the five switches (14A-14D and 22) of the power conversion circuit 10 when the power conversion circuit is operating in a similar DC-DC step-down (buck) mode. The switching diagram 120 may be similar to that of FIG. 4, but instead cycles through four states 121, 122, 123, and 124, which correspond to the operation of the power conversion circuit 10 at different stages throughout a cycle of operating in the DC-DC step-down mode.

FIGS. 5A and 5B also include a current flow diagram showing the current flowpath through the 5-switch power conversion circuit 10 when the circuit is operating in the DC-DC step-down mode. The current flow diagram includes 4 frames 125, 126, 127, and 128, which correspond to the 4 states 121, 122, 123, and 124, respectively, in the switching diagram 120.

The first operational state 121 of the switching diagram 120 is the same as the previously described operational state 112 of FIG. 4. That is, S1 (14A) and S4 (14D) are gated to the ON state and all others (14B, 14C, and 22) are in the OFF state. As shown in frame 125, current flows from the positive side (capacitor 18A) of the DC bus 20, through the gated switch transistors 14A and 14D, inductors 16, power source 12, and to the negative side (capacitor 18B) of the DC bus 20. Then, the switches S1 (14A) and S4 (14D) are turned to the OFF state to bring the power conversion circuit 10 into the second operational state 122. As shown in frame 126 of the current flow diagram, current flows through the voltage supply 12, the inductors 16, and the free-wheeling diode (FWD) of the fifth switch transistor 22. In this second operational state 122, the energy stored in the inductors 16 is transferred to the voltage supply 12 to charge the battery.

The power conversion circuit 10 is then operated according to the third operational state 123 of the switching diagram. In this state, the second, third, and fifth switches (14B, 14C, and 22) are gated to the ON state, while all others (14A and 14D) remain in the OFF state. As shown in frame 127, this allows the channels to conduct such that current flows primarily across the fifth switch 22 (and to a lesser extent across the second and third switches 14B and 14C), and the energy stored in the inductors 16 is transferred to the voltage supply 12 to charge the battery. By allowing the parallel channels to conduct, this state 123 of operation of the power conversion circuit 10 reduces the losses that would otherwise occur due to the forward-biased FWD of the fifth switch transistor 22.

The power conversion circuit 10 may be operated in this synchronous switching state 123 for much of the length of time that the battery is being recharged by the DC bus 20. Before switching back to the first state 121 of pulling energy from the DC bus 20 to the inductors 16, the second, third, and fifth switches (14B, 14C, and 22) may be turned to the OFF state to bring the power conversion circuit 10 into the fourth state 124, which is essentially the same as the second state 122.

Figure 6:
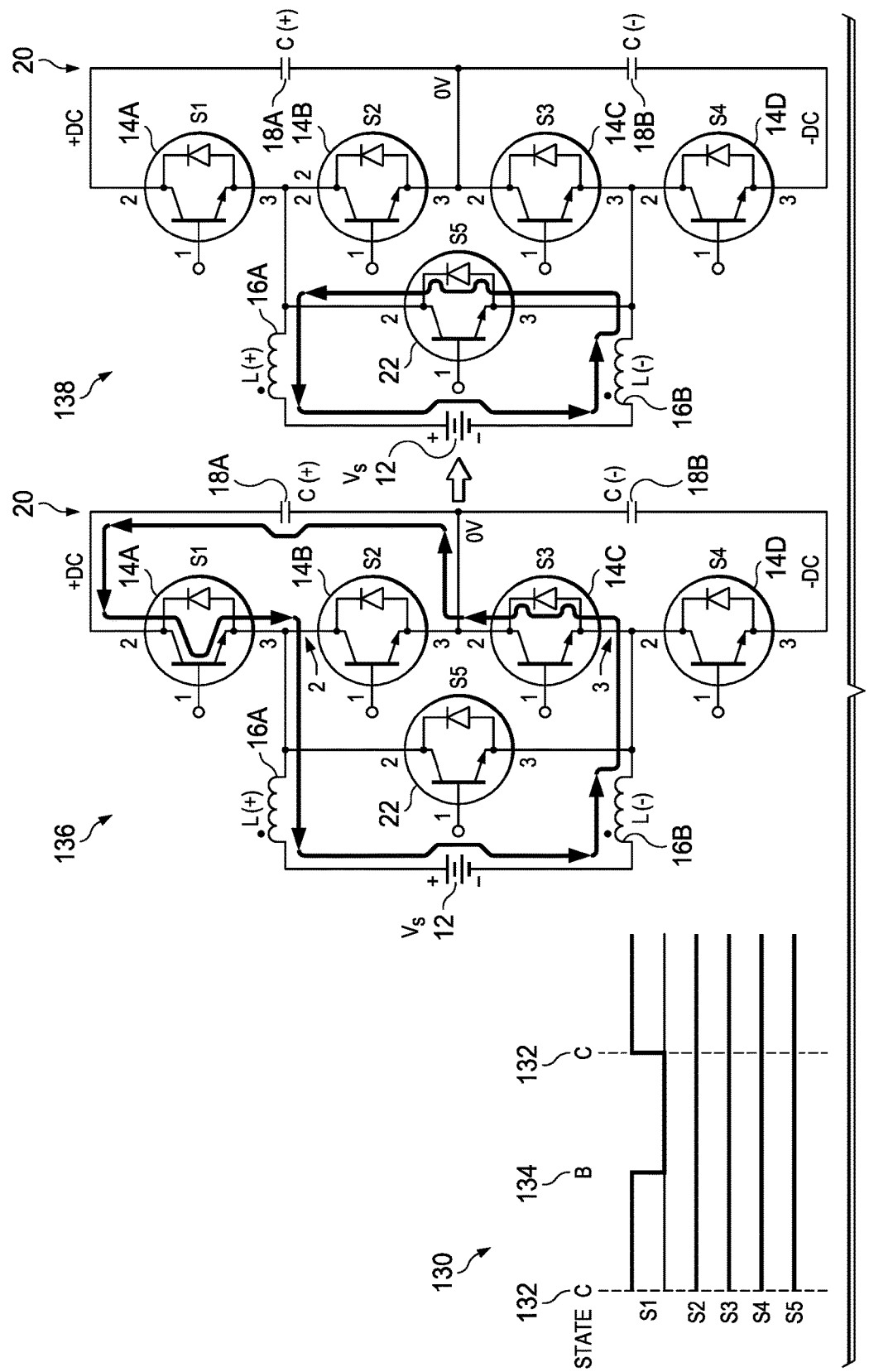
FIG. 6 is a series of schematic diagrams illustrating current flow and a switching control scheme for the 5-switch power conversion circuit of FIG. 1 when it is operated in a DC-DC step-down mode to deliver power from C(+) to a battery or other rechargeable source, in accordance with an embodiment of the present disclosure.

Another embodiment of the disclosed power conversion circuit 10 operating in a step-down converter mode is illustrated in FIG. 6. In this embodiment, the power conversion circuit 10 draws power from the positive side of the DC bus 20 to charge the power supply 12. FIG. 6 shows a switching diagram 130 for controlling the five switches (14A-14D and 22) of the power conversion circuit 10 when the power conversion circuit is operating in a DC-DC step-down mode. As shown, the switching diagram 130 alternates between two states 132 (C) and 134 (B), which correspond to the operation of the power conversion circuit 10 at different stages throughout a cycle of operating in the DC-DC step-down mode.

FIG. 6 also includes a current flow diagram showing the current flowpath through the 5-switch power conversion circuit 10 when the circuit is operating in the DC-DC step-down mode. The current flow diagram includes 2 frames 136 and 138, which correspond to the 2 states in the switching diagram 130.

In the first operational state 132, the switching diagram 130 shows S1 (14A) gated to the ON state and all other switches (14B, 14C, 14D, and 22) in the OFF state. As shown in frame 136 of the current flow diagram, current flows through the positive side (capacitor 18A) of the DC bus 20, gated switch transistor 14A, free-wheeling diode (FWD) of switch transistor 14C, inductors 16, and the power supply 12. Throughout the first state 132, the current flowing through the inductors 16 causes the inductors 16 to store energy that will later be used to charge the voltage supply 12. The switch S1 (14A) is then turned to the OFF state to bring the power conversion circuit 10 into the second operational state 134. As shown in frame 138 of the current flow diagram, current flows through the voltage supply 12, the inductors 16, and the free-wheeling diode (FWD) of the fifth switch transistor 22. In this second operational state 134, the energy stored in the inductors 16 is transferred to the voltage supply 12 to charge the battery. The power conversion circuit 10 may be cycled through these two operational states 132 and 134 until the voltage supply 12 is fully charged or charged to a desired degree.

When MOSFETs, SiC, or other switching devices are employed whose channels have the ability to conduct bi-directionally, the switching devices (14B, 14C, and 22) may be gated ON a short time after the corresponding anti-parallel diode of switch 22 has begun conducting in a freewheeling operation (e.g., in the second state 134). That is, synchronous switching may be applied to reduce the switching losses associated with operating the power conversion circuit 10 in the DC-DC step-down mode. To that end, the illustrated second operational state 134 in FIG. 6 may be replaced with the three operational states 126, 127, and 128 of FIGS. 5A and 5B. This allows the parallel channels with switching devices 14B, 14C, and 22 to conduct for a large portion of the time during which energy is being transferred from the inductors 16 to the voltage supply 12 to charge the battery.

Figure 7:
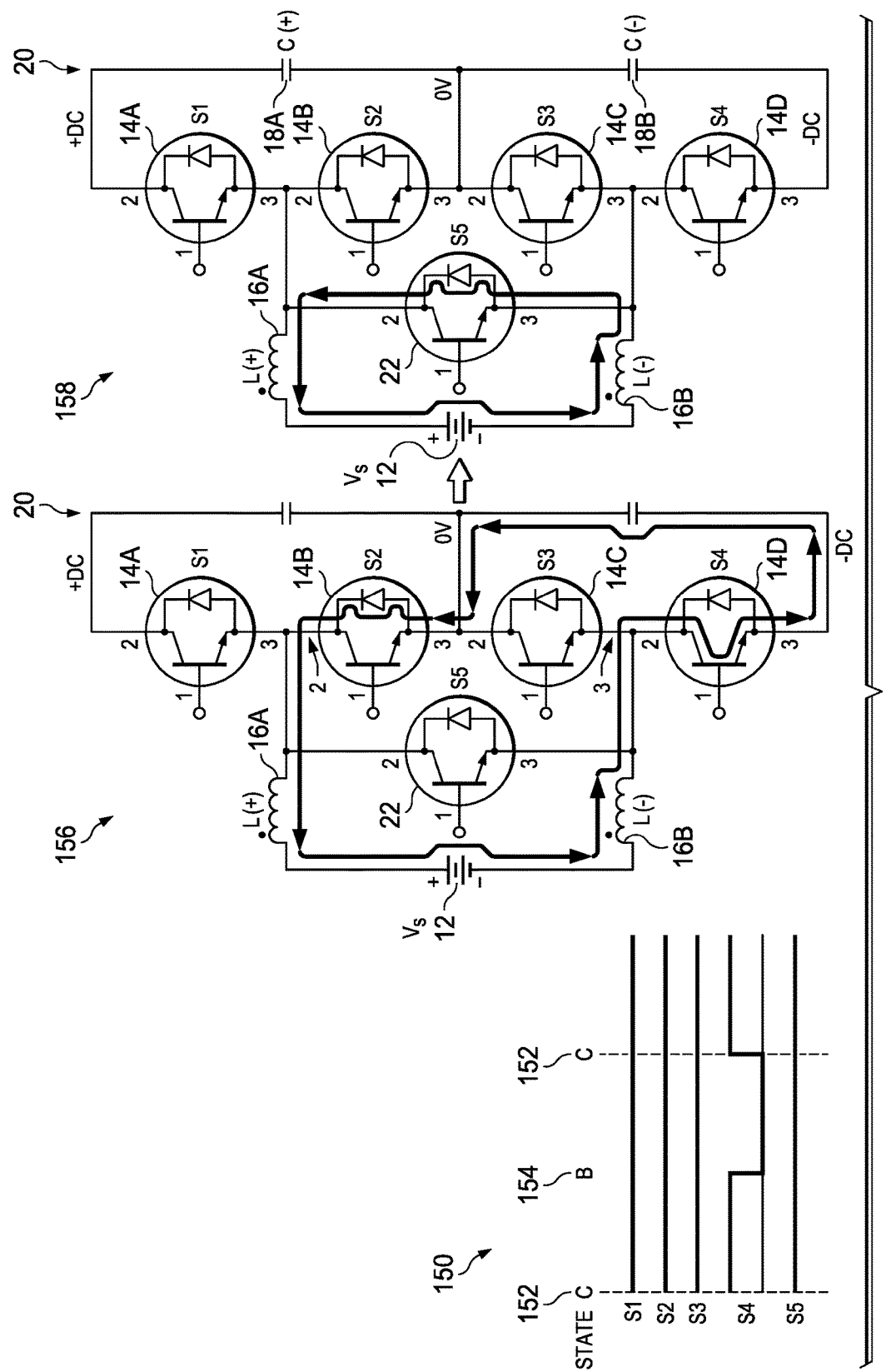
FIG. 7 is a series of schematic diagrams illustrating current flow and a switching control scheme for the 5-switch power conversion circuit of FIG. 1 when it is operated in a DC-DC step-down mode to deliver power from C(−) to a battery or other rechargeable source, in accordance with an embodiment of the present disclosure.

In other embodiments, it may be desirable to charge the power supply 12 using power drawn from the other (negative) side of the DC bus 20. FIG. 7 depicts the power conversion circuit 10 operating in such a DC-DC step-down mode. FIG. 7 shows a switching diagram 150 for controlling the five switches (14A-14D and 22) of the power conversion circuit 10 when the power conversion circuit is operating in a DC-DC step-down mode. As shown, the switching diagram 150 alternates between two states 152 (C) and 154 (B), which correspond to the operation of the power conversion circuit 10 at different stages throughout a cycle of operating in the DC-DC step-down mode.

FIG. 7 also includes a current flow diagram showing the current flowpath through the 5-switch power conversion circuit 10 when the circuit is operating in the DC-DC step-down mode. The current flow diagram includes 2 frames 156 and 158, which correspond to the 2 states in the switching diagram 150.

In the first operational state 152, the switching diagram 150 shows S4 (14D) gated to the ON state and all other switches (14A, 14B, 14C, and 22) in the OFF state. As shown in frame 156 of the current flow diagram, current flows through the negative side (capacitor 18B) of the DC bus 20, free-wheeling diode (FWD) of switch transistor 14B, gated switch transistor 14D, inductors 16, and the power supply 12. Throughout the first state 152, the current flowing through the inductors 16 causes the inductors 16 to store energy that will later be used to charge the voltage supply 12. The power conversion circuit 10 may be run in this operational state 152 for a relatively long amount of time.

The switch S4 (14D) is then turned to the OFF state to bring the power conversion circuit 10 into the second operational state 154. As shown in frame 158 of the current flow diagram, current flows through the voltage supply 12, the inductors 16, and the free-wheeling diode (FWD) of the fifth switch transistor 22. In this second operational state 154, the energy stored in the inductors 16 is transferred to the voltage supply 12 to charge the battery. The power conversion circuit 10 may be cycled through these two operational states 152 and 154 until the voltage supply 12 is fully charged or charged to a desired degree.

When MOSFETs, SiC, or other switching devices are employed whose channels have the ability to conduct bi-directionally, the switching devices (14B, 14C, and 22) may be gated ON a short time after the corresponding anti-parallel diode of switch 22 has begun conducting in a freewheeling operation (e.g., in the second state 154). That is, synchronous switching may be applied to reduce the switching losses associated with operating the power conversion circuit 10 in the DC-DC step-down mode. To that end, the illustrated second operational state 154 in FIG. 7 may be replaced with the three operational states 126, 127, and 128 of FIGS. 5A and 5B. This allows the parallel channels with switching devices 14B, 14C, and 22 to conduct for a large portion of the time during which energy is being transferred from the inductors 16 to the voltage supply 12 to charge the battery.

It may be desirable to apply any one of the above described DC-DC buck converter operations depending on certain aspects of the overall converter system. For example, the DC-DC buck mode operation illustrated in FIGS. 4 and 5 may be useful for charging the battery (i.e., voltage supply 12) when the battery voltage is greater than the DC bus voltage divided by two (Vbat>Vbus/2). The DC-DC buck mode operation illustrated in FIG. 6 or FIG. 7 (e.g., pulling from one side or the other of the DC bus 20) may be useful for charging the battery when the battery voltage is less than the DC bus voltage divided by two (Vbat<Vbus/2). In some embodiments, the power conversion circuit 10 may be operated according to FIGS. 4 and 5 (i.e., pulling from both sides of the DC bus 20) when the battery voltage is less than the DC bus voltage divided by two (Vbat<Vbus/2), however the power conversion circuit would have to be cycled through at a lower duty cycle than if it were using just one side of the DC bus 20 to charge the power supply 12. Pulling from the total DC bus 20 (FIGS. 4 and 5), as opposed to from one side or the other (FIGS. 6 and 7), can be applied to help balance the DC bus 20 when using a half-bridge based boost converter where only the total DC bus is being monitored.

As described at length above, the disclosed power conversion circuit 10 features the fifth transistor switch 22, which provides reduced conduction losses through the system when operating in the DC-DC boost mode. The same power loss reduction may also be achieved via the fifth switch 22 when the system operates in the battery charging (buck) mode of FIGS. 4-7. This is because the fifth switch 22 provides a reduced conduction path through the FWD of the switch 22 as compared to a path using the second and third switches 14B and 14C. The reduced power losses through the circuit allows the system to achieve a higher PCE than would be possible using a typical 3-level boost converter topology.

Having now described the general operation of the power conversion circuit 10 in various DC-DC power conversion modes, a process of estimating the reduced power losses available through the power conversion circuit 10 will now be provided. To determine an estimate of the power losses through the 5-switch power conversion circuit 10, a simulation was performed for a similar DC-DC conversion circuit. This circuit is used as a baseline for comparing the power losses through different versions of a DC-DC converter circuit (including the 5-switch circuit disclosed herein).

The baseline power conversion circuit modeled in the simulation is a half-bridge voltage doubler circuit 170 operating in a DC-DC boost mode, as illustrated in FIG. 8. The baseline converter circuit 170 generally includes semiconductor switches 172 (IGBT 172A and diode 172B), an inductor 174, and a capacitor 176. Power losses were estimated for this baseline converter 170 during the simulation, using input and output DC voltages that are typical for the type of DC-DC boost operations that may be performed using the disclosed 5-switch conversion circuit. Specifically, the input DC voltage for the simulation was 144 Vdc and the output DC voltage was 200 Vdc. Thus, the results of the simulation were determined using realistic input and output DC voltages and power levels for a device used in certain products (e.g., UPS).

In the simulation results, the calculated power losses are associated only with the semi-conductor switches 172 and not with the inductor 174 or the capacitor 176. The calculated power losses result from both conduction losses through the semi-conductor switches 172 as well as the switching losses associated therewith. Using these constraints, the calculated power losses are approximately 71.73 Watts (W) for the IGBT 172A and approximately 32.54 W for the diode 172B. Thus, the total power losses for the baseline power converter 170 are approximately 104.27 W.

Estimated power losses can also be determined for an existing 3-level DC-DC chopper circuit. This DC-DC converter includes a 3-level circuit topology with four switches. To modify the power loss parameters from the baseline converter simulation, the turn-ON conduction loss associated with the IGBT 172A is doubled, and a turn-OFF conduction loss associated with the diode 172B is added to the total power loss. The turn-OFF conduction loss associated with the diode is approximately equal to that of one IGBT 172A scaled by a factor of (1−D)/D, since the IGBT conducts at the same time as the diode in the 3-level converter, and this simulation was applied for an IGBT and FWD having similar forward Voltage characteristics. The variable D represents the duty cycle, which is approximately equal to 0.28 as determined based on the input/output DC voltages (e.g., 144 Vdc to 200 Vdc).

According to the simulation results, the power loss for switching the IGBT to the ON-state is approximately 8.11 W, for switching the IGBT to the OFF-state is approximately 10.62, and for switching the diode is approximately 6.99 W. The total switching power losses for one side of the power conversion circuit is therefore estimated to be 8.11+10.62+ 6.99=25.72 W. According to the simulation results, the conduction loss associated with the IGBT is approximately 3.04 W and the conduction loss associated with the diode is approximately 8.43 W. Accordingly, the total power losses associated with one side of the power conversion circuit is estimated to be approximately 3.04×2+3.04×(1−0.28)/0.28+ 8.43=22.33 W. The total power loss through the 3-level DC-DC boost circuit is then estimated as (25.72 W+22.33 W)×2=96.09 W. Therefore, the power losses in this instance are approximately 92.2% of the losses associated with the baseline converter 170, due to the enhanced 3-level topology of the power conversion circuit.

The simulation results may be further modified to estimate the power losses associated with the presently disclosed 5-switch DC-DC power conversion circuit 10 of FIG. 1. As described above, this DC-DC converter includes a 3-level circuit topology with five switches (14A-D and 22). For this circuit, since the fifth switch 22 is in parallel with the second and third switches (14B and 14C) across from the S2-collector to the S3-emitter, it is possible to estimate the reduction in conduction losses through the circuit. The results of the 3-level converter simulation may be modified by subtracting the turn-OFF conduction loss associated with the IGBT from each side of the power conversion circuit, which is the same as subtracting two times the turn-OFF conduction loss from the total power loss. Thus, the total power losses associated with the 5-switch power conversion circuit 10 are estimated to be approximately 96.09−(2×3.04) =90.01 W. Therefore, the power losses in this instance are approximately 86.3% of the losses associated with the baseline converter 170, due to the use of the 3-level architecture and the added fifth switch.

The exact reduction of power losses due to using the disclosed 5-switch power conversion circuit may differ depending on the frequency of switching, type of devices used, and other factors. In some embodiments, it may be possible to use devices in the 5-switch power conversion circuit that have even lower switching losses due to having a lower blocking voltage rating. Therefore, it may be possible to further reduce the power losses through the system.

Figure 9:
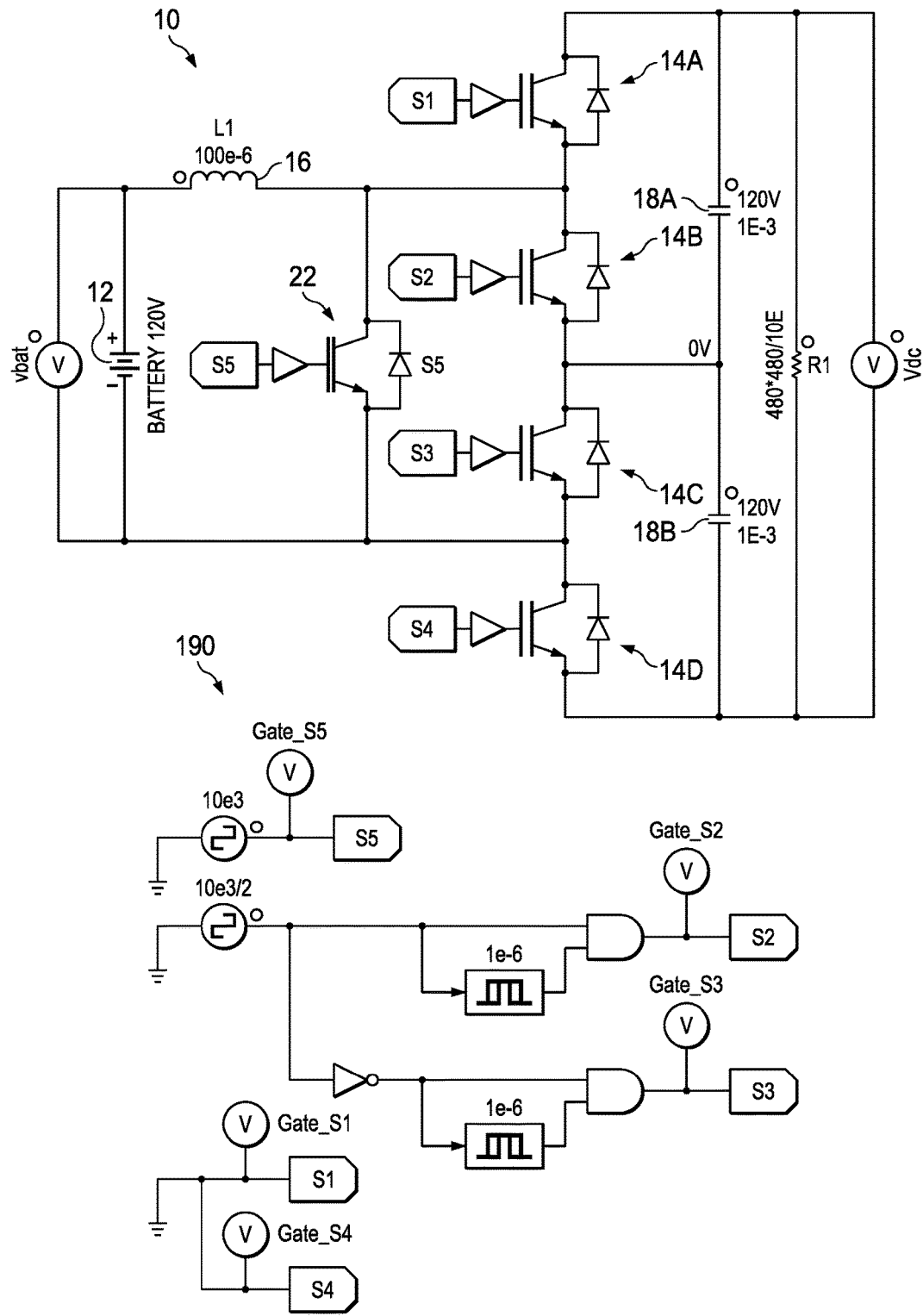
FIG. 9 is a schematic diagram illustrating a 5-switch power conversion circuit with a corresponding gate logic circuit, in accordance with an embodiment of the present disclosure.

FIG. 9 illustrates an excerpt from a simulation of the disclosed 5-switch power conversion circuit 10, including the detailed power conversion circuit 10 along with a proposed gate-logic circuit 190 for operating the switches 14A-14D and 22 in the DC-DC boost operating mode described above.

As mentioned above, the disclosed power conversion circuit 10 having five switches allows the system to achieve a higher PCE than would be possible using a typical 3-level boost converter topology with only four switches. Due to the increased PCE, the disclosed power conversion circuit 10 may improve the load handling capabilities of the power converter while using standard (or improved) power switching devices for better overall gains.

The increased PCE available through the disclosed circuit design offers many benefits in power conversion systems. Specifically, the DC-DC power converter 10 with increased PCE is able to operate with lower overall power losses, which enables the carrier frequency of the converter system to be increased. The increased carrier frequency leads to a reduction in size (and cost) of the magnetics (e.g., inductors) and improves the ability of a UPS subsystem or auto shutdown (ASD) system to handle unbalanced loads and/or load transients. This could lead to a reduction in the capacitance values needed for the system, thereby reducing the physical size, weight, and cost of the electrolytic capacitors supporting the DC bus. Therefore, the disclosed power conversion circuit 10 may enable the usage of smaller and/or lower cost devices, while enhancing the ability of a UPS or ASD subsystem to support unbalanced loads or loads having a significant DC component.

Although the disclosure and its advantages have been described in detail, it should be understood that various changes, substitutions and alterations can be made herein without departing from the spirit and scope of the disclosure as defined by the following claims.

What is claimed is:

1. A power conversion system, comprising:
   a 5-switch power conversion circuit comprising:
      a voltage supply;
      a first inductor coupled to a positive side of the voltage supply and a second inductor coupled to the negative side of the voltage supply;
      a DC bus comprising a first capacitor on a positive side of the DC bus and a second capacitor on a negative side of the DC bus;
      a first switch transistor, a second switch transistor, a third switch transistor, and a fourth switch transistor each coupled between the at least one inductor and the DC bus in a 3-level DC-DC boost circuit configuration;
      a fifth switch transistor disposed between the at least one inductor and the first, second, third, and fourth switch transistors, wherein the fifth switch transistor is coupled in parallel to the second and third switch transistors;
      a controller communicatively coupled to the first, second, third, fourth, and fifth switch transistors, wherein the controller is configured to output signals to the first, second, third, fourth, and fifth switch transistors to independently control the positions of the first, second, third, fourth, and fifth switches and wherein the controller is configured to output a signal to the fifth switch transistor to turn the fifth switch transistor to an ON-state when both the second and third switch transistors are in an ON-state such that current will flow through the inductors and the fifth switch transistor instead of through the inductors and the second and third switches so as to reduce conduction losses through the power conversion system due to the current flowing primarily through the fifth switch transistor instead of the second and third switch transistors.

2. The power conversion system of claim 1, wherein the controller is configured to delay turning the fifth switch transistor to the ON-state until after the second and third switch transistors have been in the ON-state for a predetermined amount of time.

3. The power conversion system of claim 1, wherein the controller is configured to output a signal to the fifth switch transistor to turn the fifth switch transistor to an OFF-state a predetermined amount of time before turning either the second switch transistor or the third switch transistor to an OFF-state.

4. The power conversion system of claim 1, wherein the controller is configured to operate the 5-switch power conversion circuit in a DC-DC boost mode.

5. The power conversion system of claim 1, wherein the controller is configured to operate the 5-switch power conversion circuit in a DC-DC step-down mode.

6. The power conversion system of claim 1, wherein the voltage supply comprises a rectified DC input or a DC input supplied by a battery.

7. The power conversion system of claim 1, wherein the first switch transistor is coupled between a first side of the voltage supply and a first side of the first capacitor, the second switch transistor is coupled between the first side of the voltage supply and a second side of the first capacitor, the third switch transistor is coupled between a second side of the voltage supply and a first side of the second capacitor, and the fourth switch transistor is coupled between the second side of the voltage supply and a second side of the second capacitor.

8. A method, comprising:
   providing a 5-switch power conversion circuit comprising:
      a voltage supply;
      at least one inductor coupled to the voltage supply;
      a DC bus comprising a first capacitor on a positive side of the DC bus and a second capacitor on a negative side of the DC bus;
      a first switch transistor, a second switch transistor, a third switch transistor, and a fourth switch transistor each coupled between the at least one inductor and the DC bus in a 3-level DC-DC boost circuit configuration; and
      a fifth switch transistor disposed between the at least one inductor and the first, second, third, and fourth switch transistors, wherein the fifth switch transistor is coupled in parallel to the second and third switch transistors;
   operating the 5-switch power conversion circuit in a DC-DC boost mode to convert power input from the voltage supply at a first voltage to power output to the DC bus at a second voltage higher than the first voltage;
   controlling an operation of the 5-switch power conversion circuit via control signals sent to selectively actuate the first, second, third, fourth, and fifth switch transistors between an OFF-state and an ON-state; and actuating the fifth switch transistor from the OFF-state to the ON-state when both the second and third switch transistors are in the ON-state such that current will flow through the inductor and the fifth switch transistor instead of through the inductor and the second and third switches so as to reduce conduction losses through the power conversion system due to the current flowing primarily through the fifth switch transistor instead of the second and third switch transistors.

9. The method of claim 8, further comprising delaying actuation of the fifth switch transistor from the OFF-state to the ON-state until a predetermined amount of time after both the second and third switch transistors are in the ON-state.

10. The method of claim 8, further comprising actuating the fifth switch transistor from the ON-state back to the OFF-state a predetermined amount of time prior to actuating one of the second switch transistor or the third switch transistor from the ON-state to the OFF-state.

11. The method of claim 8, further comprising:
directing current through the voltage supply, the at least one inductor, and the fifth switch transistor to store energy in the at least one inductor;
directing current through the at least one inductor, a free-wheeling diode of the first switch transistor, the first capacitor, and the third switch transistor to output stored energy from the inductor to the positive side of the DC bus; and
directing current through the at least one inductor, the second switch transistor, the second capacitor, and a free-wheeling diode of the fourth switch transistor to output stored energy from the inductor to the negative side of the DC bus.

12. The method of claim 8, further comprising operating the 5-switch power conversion circuit in a DC-DC step-down mode to draw power from the DC bus to recharge the voltage supply.

13. The method of claim 12, further comprising drawing power from both sides of the DC bus to recharge the voltage supply when a battery voltage of the voltage supply is greater than a DC bus voltage of the DC bus divided by two.

14. The method of claim 12, further comprising drawing power from the positive side or the negative side to recharge the voltage supply when a battery voltage of the voltage supply is less than a DC bus voltage of the DC bus divided by two.

15. The method of claim 12, further comprising:
directing power from one or both sides of the DC bus via current flowing through the at least one inductor, one or both capacitors, and two of the switch transistors to store energy in the at least one inductor; and
directing current through the at least one inductor, the voltage supply, and a free-wheeling diode of the fifth switch transistor to output the stored energy from the at least one inductor to the voltage supply.

16. The method of claim 12, further comprising controlling the operation of the 5-switch power conversion circuit in the DC-DC step-down mode by actuating one or both of the first switch transistor and the fourth switch transistor between an OFF-state and an ON-state.

* * * * *